United States Patent [19]

Robinson, Jr. et al.

[11] Patent Number: 4,493,274
[45] Date of Patent: Jan. 15, 1985

[54] FURROW FORMING APPARATUS FOR A SEED PLANTER

[75] Inventors: Edward L. Robinson, Jr., Naperville; Tom G. Stamp, Downers Grove, both of Ill.

[73] Assignee: International Harvester Company, Chicago, Ill.

[21] Appl. No.: 153,974

[22] Filed: May 28, 1980

[51] Int. Cl.³ .................................................. A01C 5/06
[52] U.S. Cl. ........................................ 111/88; 111/85; 172/519; 172/536; 172/538
[58] Field of Search ..................... 111/88, 87, 85, 3; 172/538, 575, 536, 519

[56] References Cited

U.S. PATENT DOCUMENTS

| 448,349 | 3/1891 | King | 111/88 X |
|---|---|---|---|
| 1,150,537 | 8/1915 | Roby | 172/538 |
| 1,234,372 | 7/1917 | Miller | 111/87 |
| 1,311,427 | 7/1919 | Tulloss | 111/DIG. 1 |
| 2,003,390 | 6/1935 | Poll et al. | 111/3 |
| 2,249,637 | 7/1941 | Rietz | 172/519 |
| 2,258,626 | 10/1941 | Satrom | 172/536 |
| 2,685,243 | 8/1954 | Cole | 111/88 X |
| 3,499,495 | 3/1970 | Pust | 172/536 |
| 3,658,018 | 4/1972 | Connor | 111/88 |
| 4,009,668 | 3/1977 | Brass et al. | 111/85 |

FOREIGN PATENT DOCUMENTS

| 497644 | 12/1950 | Belgium | 172/536 |
|---|---|---|---|
| 2415420 | 9/1979 | France | 111/88 |
| 19924 | 2/1905 | Sweden | 111/88 |

Primary Examiner—Steven A. Bratlie
Attorney, Agent, or Firm—Dennis K. Sullivan; F. David AuBuchon

[57] ABSTRACT

An apparatus to be towed that includes a frame supported, rotatably mounted, pair of furrow forming disks that are arranged to substantially contact each other at the approximate point of entry into the soil and diverge apart rearwardly and upwardly, and a frame supported, rotatable gauge wheel located adjacent each disk, with each wheel having a radially inwardly located recessed lip immediately adjacent the disk to trap soil removed from the furrow to form a mound of moist and substantially uncompacted soil along the edge of the furrow.

9 Claims, 7 Drawing Figures

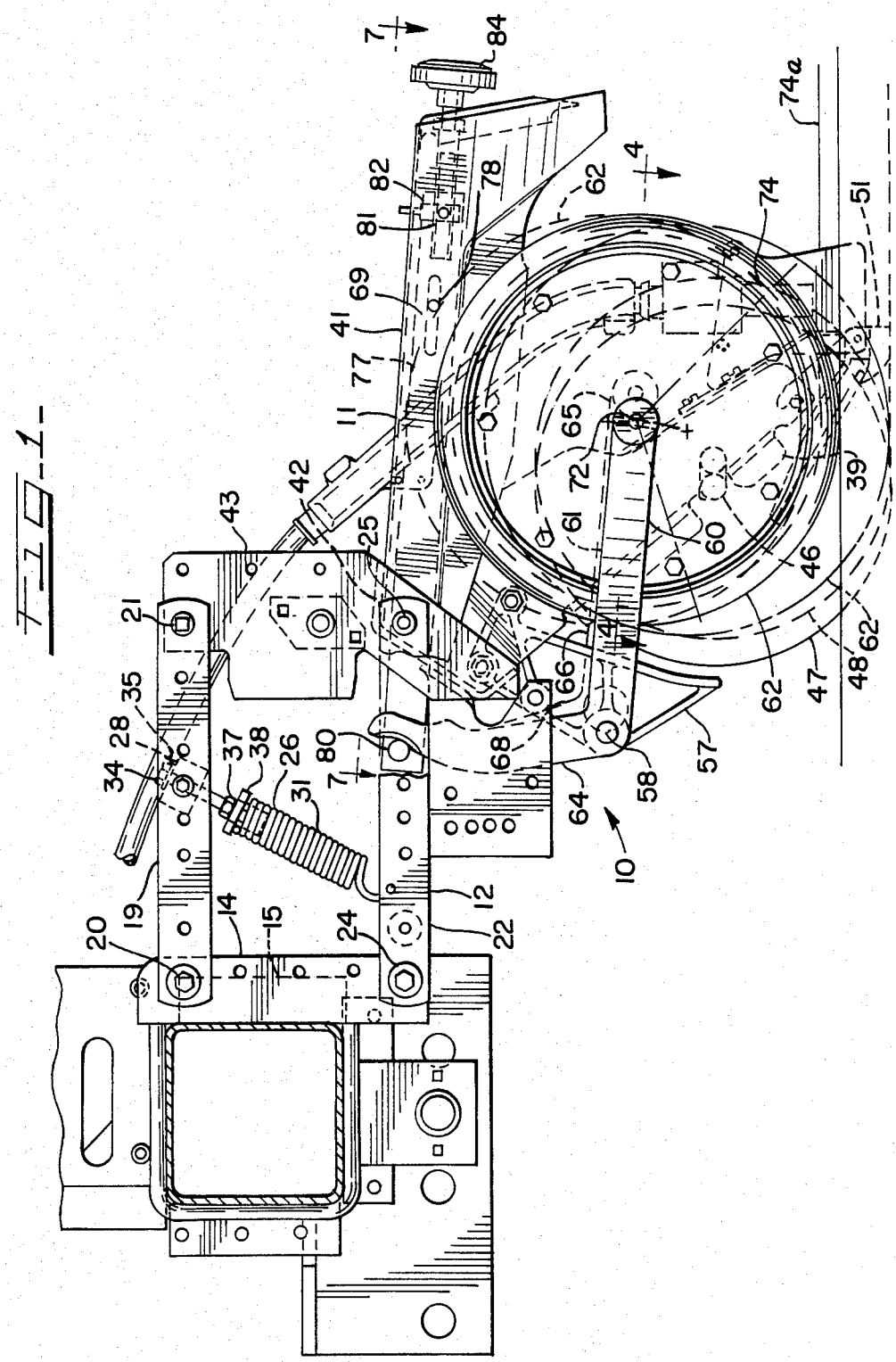

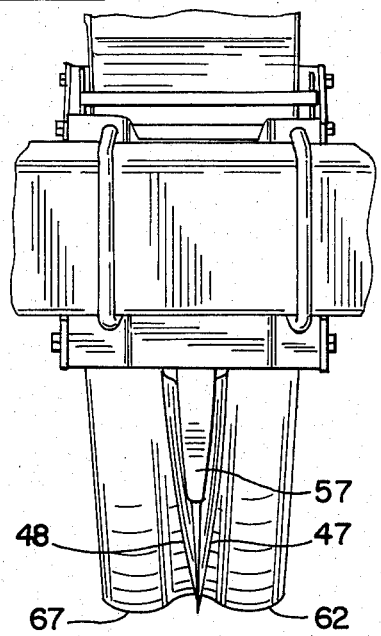
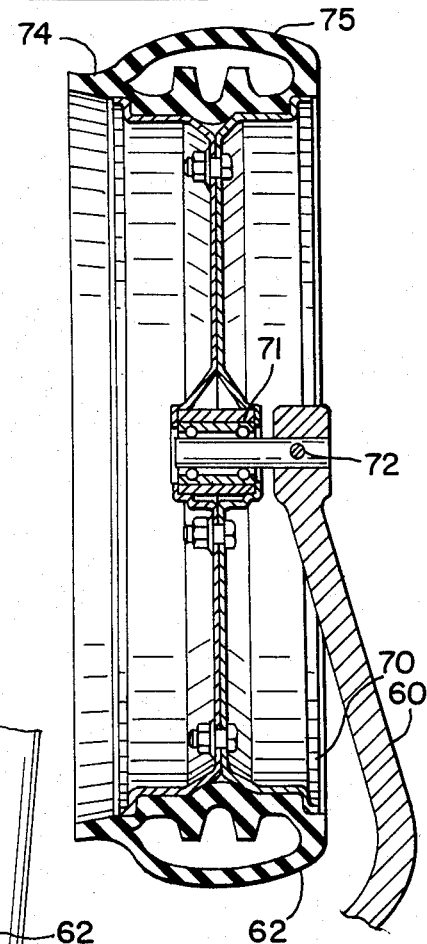
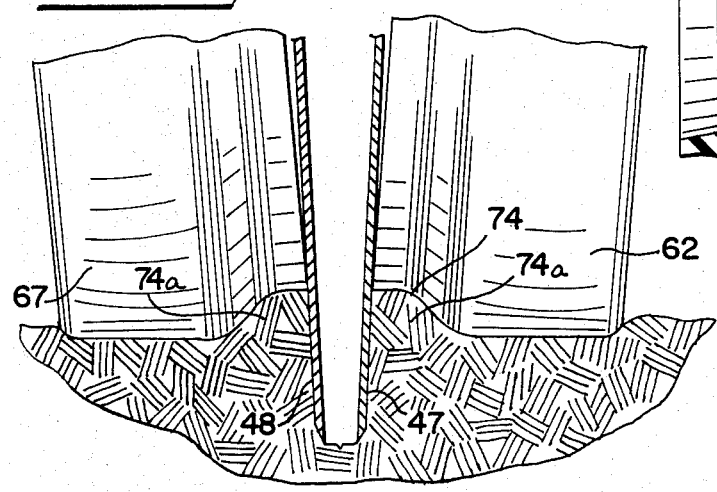
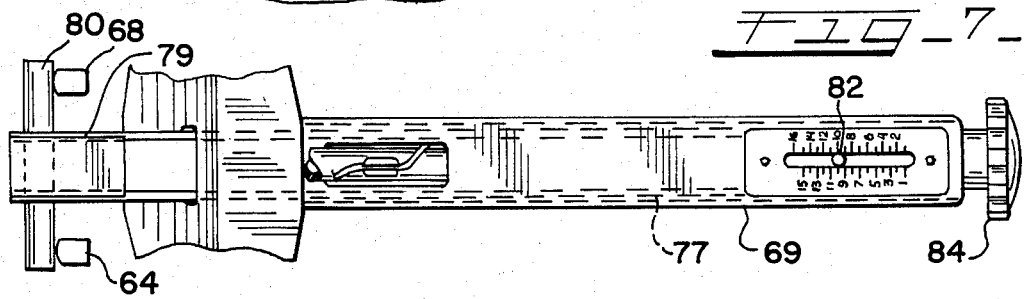

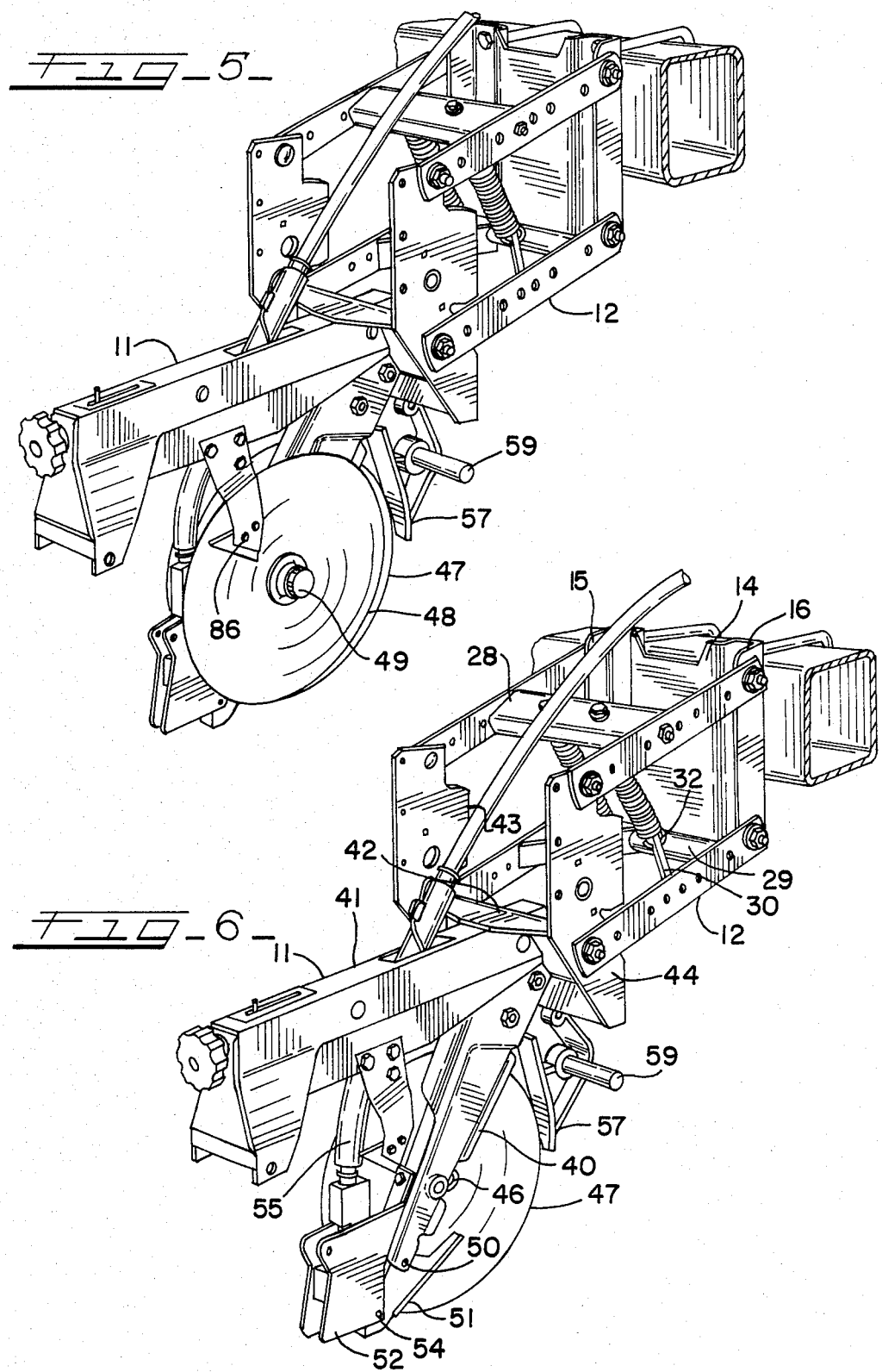

FURROW FORMING APPARATUS FOR A SEED PLANTER

BACKGROUND OF THE INVENTION

1. Field of the Invention

This invention pertains generally to agricultural planting equipment.

2. Description of the Prior Art

The efficient production of crops requires that seed planters meet certain primary design objectives which are: creating a furrow having an accurate planting depth and preferably providing soil having a reasonably high moisture content for early germination, accurate seed spacing, and seed and soil contact. This invention is concerned only with the furrow forming aspect of the planter.

A known seed planter utilizes a conventional pair of rotatably mounted, generally flat disk openers that substantially contact each other where the disks enter the ground and which diverge apart rearwardly and upwardly. The disks are supported on a frame which is connected to a tool bar by a parallel bar linkage so that the frame is maintained in a generally horizontal position parallel to the tool bar despite varying ground contours. Individually and pivotally supported from the frame closely adjacent each disk are rotatable gauge wheels with semi-pneumatic tires. Each gauge wheel is inclined somewhat to its respective disk so that a lip portion may approach and possibly scrape the disk. Since the wheels are located rearwardly of the disk axes, the wheels essentially gauge and scrape where the disks exit the ground and thus compact the soil to form a generally V-shaped furrow with flat upper walls. It is to be noted that raising or lowering the wheels allows the disks to penetrate to a deeper or shallower extent and thus controls furrow depth.

Also to be noted is that when a wheel contacts an obstruction, and the other wheel does not, that the frame can be raised by the single wheel with the disks being supported only by one wheel at that time in cantilever fashion. Hence, the frame and disks will deviate somewhat from the horizontal and not provide accurate depth control. This is not a problem when each wheel is mounted close to its associated disk. This is a considerable problem when the wheels are substantially spaced laterally from the associated disks. Of course, clogging becomes more prevalent then also. If the wheels are not individually supported for rotation the situation is essentially the same. Equalizer systems due in part to elevational limits, also encounter this problem.

Longitudinally, the most accurate disk gauging is achieved by orienting the axes of the gauge wheels colinear with the respective disk axes. But, of course, this would not compact the soil scraped from the disks where same exit the soil.

Thus, the prior art structure generally produces furrows of accurate depth for the seed drop which usually occurs at the point where the disks exit the soil but results in a generally V-shaped furrow with flat upper walls. These walls are usually collapsed on the seed deposited in the furrow by laterally angled firming wheels which cover the seed while not compacting the soil over the seed. Unfortunately the walls and surfaces adjacent the furrow consist of dry soil, with the soil removed from the furrow being compacted and mixed with the dry surface soil, and do not possess as high a moisture content as the soil merely removed from the furrow. Further, in hard dry soils the angled firming wheels require a high spring load which often causes gauging to also occur at the angled firming wheels which adversely affects furrow depth and also the pinch wheels can even lift the seeds above that desired at shallow planting depths.

SUMMARY OF THE INVENTION

Applicants desire the most accurate gauging possible where the gauge wheels contact or substantially contact the disks and thus avoid the load problem when a wheel contacts an obstacle and the other does not as mentioned above, and also to eliminate the clogging problem. Applicants also desire the gauging to occur longitudinally close to the axes of the disks and not necessarily where the disks exit the ground for seed placement shoes (deflectors) can be utilized to prevent soil flow back into the newly created furrow until the seed is deposited. Further, to prevent the seed from falling on the small amount of soil necessarily left in the furrow, Applicants provide a compaction runner with a rearwardly supported V-shaped element to provide a clean, firmed, and maintainable V contour to the bottom of the furrow.

Applicants, however, do not want the disadvantageous flat upper walls of the furrow which must be collapsed to cover the seed. Applicants prefer to leave a relatively uncompacted mound of moist soil from the furrow along the upper edge of the furrow walls. This then can be moved into the furrow by various suitable means to cover the seed with desirable, moist soil for early germination.

Applicants achieve this desired result by the utilization of a particular gauge wheel for each associated disk. Specifically, each gauge wheel has a radially inwardly located recessed lip that is positioned immediately adjacent the disk and may closely approach same where the disk enters and leaves the soil. The wheel axis is inclined laterally and downwardly slightly away from the disk to further reduce any pressure applied to the mound along the upper edge of the furrow. The recessed lip, which may be peripheral, traps moist soil removed from the furrow and with the disk creates the mounds. It also prevents trash from moving between the disk and wheel. Since of limited lateral extent, the gauging by the wheel is still essentially achieved very close to the disk to avoid the load problems when one wheel supports the frame as mentioned above.

Where low tillage usage may be encountered, Applicants stagger the disks longitudinally so that one disk enters the soil before the other to more easily cut through trash. The wheels are then similarly staggered longitudinally with no substantial effect on gauging since, when mounted, the wheel diameters may be 16 inches.

It is, therefore an object of this invention to provide a new and improved furrow forming apparatus for a seed planter.

Another object is to provide an apparatus that produces a furrow having an accurately controllable depth while maintaining desirable furrow contours.

BRIEF DESCRIPTION OF THE DRAWINGS

FIG. 1 is a side elevational view of the apparatus of this invention;

FIG. 2 is a view looking rearward before the tool bar showing the apparatus set at zero furrow depth;

FIG. 3 is essentially a schematic view immediately before the gauge wheel bearings looking rearward showing the furrow walls and mounds formed alongside the furrow;

FIG. 4 is a sectional view of a gauge wheel and support arm taken along 4—4 of FIG. 1;

FIG. 5 is a perspective right side view primarily of the right disk and scraper with the associated gauge wheel of the apparatus removed;

FIG. 6 is a view similar to FIG. 5 but with the right disk removed; and

FIG. 7 is a partial plan view of the apparatus taken along 7—7 of FIG. 1 showing the gauge wheel adjustment.

DESCRIPTION OF THE PREFERRED EMBODIMENT

Referring to FIGS. 1, 2, 5 and 6, 10 indicates a furrow forming apparatus for a seed planter. Apparatus 10 has a frame 11. Apparatus 10 includes a mounting means 12 for attachment to a mobile power source such as a tractor or tool bar for towing. Mounting means 12 includes a head bracket 14 having lateral flanges 15 and 16. Bracket 14 has suitable holes for connection thereof to the tool bar by U-bolts and nuts. Dual spaced upper links 19 are pivotally connected to the upper part of flanges 15 and 16 at pivots 20 by suitable fasteners and are similarly connected to frame 11 at 21. Dual, spaced lower links 22 are similarly connected between the noted flanges at pivots 24 and the frame at 25. The conventional parallel link arrangement described allows the apparatus to follow the ground contour in operation.

Where the apparatus does not have sufficient weight to create the furrow, dual biasing means 26 are provided. Each means 26 extends between channel 28 attached between upper links 19 and support structure which includes tube 29 rigidly connected between links 22 and braces 30 extending between tube 29 and each link 22. Means 26 includes spring 31 having a hook end 32 which connects with a suitable aperture in brace 30. Bolt 34, top washer 35 and lock nut 37 along with internally threaded plug 38 which is also threaded inside spring 31, connect the spring 31 to the top channel 28. It can be seen that spring adjustment can be provided by loosening lock nut 37 and rotating bolt 34 clockwise which will cause the plug 38 to move thereto, thereby extending spring 31. Due to the connection of spring 31 to the upper links 19 remote from pivot 20, compared to the hook end 32 of spring 31 which is located close to pivot 24, the parallel linkage is spring loaded downwardly to increase the force applied to the opener disks 47 and 48 to ensure that they penetrate the soil. Moving top channel 28 to other holes shown in top links 19 will provide further adjustment.

Frame 11 is a weldment that provides the necessary structure for all elements of the apparatus. As shown best in FIGS. 1 and 6, frame 11 consists of left 39 and right hand 40 lower sheets that provide the support for the later to be described disks, compaction runner, seed shoe (deflector), and gauge wheels. Frame 11 also includes upper channel 41 which is welded to the sheets and which houses the gauge wheel adjustment and spreader plate 42 which primarily provides support for left and right hand plates 43 and 44 on which are mounted pivots 21 and 25 of the parallel bar linkage. Suitable structure in the plates provide stops as desired for the parallel linkage.

Referring also to FIG. 6, support 46 is welded into sheets 39 and 40 and supports furrow forming disks 47 and 48. Preferably the axes of the 14 inch diameter disks are staggered longitudinally by one inch with left disk 47 forward and the axes inclined so that the included angle is 9.5 degrees and the disks substantially contact each other at a point forward of their axes at about 38 degrees downwardly from the horizontal. As shown in FIG. 5, flange type bearings 49 are utilized which are rotatably connected to support 46 welded to frame 11 by bolts threaded therein.

Located below support 46 is pin 50 which loosely supports compaction runner 51. Runner 51 also has a lower V-shaped configuration that extends slightly below the disks to provide the desired firmed furrow configuration. Runner 51 is also supported on rearward deflector or shoe 52 via pin 54 with shoe 52 being attached to sheets 39 and 40 by suitable cap screws shown. Shoe 52 is also spaced for seed tube 55 which extends therebetween to drop seed rearward of the V-shaped portion of the runner 51 into a furrow. Shoe 52 also prevents the movement of loose soil into the furrow until the seed has been deposited.

Located forwardly of support 46 and connected between sheets 39 and 40 by suitable fasteners is gauge wheel mounting 57. Mounting 57 has pins 58 and 59 which are staggered longitudinally by one inch as the disks, with pin 58 forward and the pins are threaded into the mounting on axes parallel to the disk axes. As shown best in FIG. 1, mounted on pin 58 is left hand arm or support 60. Arm 60 has a rearwardly extending portion 61 that is connected to gauge wheel assembly 62 and a forwardly extending portion 64. Right hand arm of support 65 is similar to 60, and has rearward portion 66 for gauge wheel assembly 67 (not shown in FIG. 1) but, because of the staggered mounting, has a longer forward upper portion 68 than 64 since they are transversely aligned to contact gauge wheel depth adjustment mechanism 69.

Gauge wheel assembly 62 (see FIG. 4) is typical for both arms 60 and 65 and includes wheel 70 made from composite elements connected by suitable fasteners. Each arm 60 (and 65) is connected to a roller bearing 71 with an integral shaft by pin 72. It is to be noted that the bore for bearing 71 in arm 60 is inclined laterally outwardly and downwardly by about 2.50° from the associated disk, as shown in FIG. 3, so that radially inward, peripheral lip 74 of semi pneumatic tire 75 will substantially contact its disk at an arc of about 8:30 to 4:30 throughout its travel as shown in FIG. 1 in broken lines and create uncompacted mound 74a of loose soil along the furrow wall. This arc extends beyond the point of entry of the disk into the soil and its exit and helps prevent flow of trash between wheel and disk. Primarily it provides a mound of uncompacted soil for deposition into a furrow to provide uniform cover for the seed regardless of soil type in conjunction with the other gauge wheel. The flexing of tire 75 helps prevent the caking of soil thereon.

Gauge wheel adjustment mechanism 69 is shown best in FIGS. 1 and 7. Adjusting mechanism 69 is located in upper channel 41 of frame 11 and is readily accessible from the end of the apparatus remote from the tool bar. Mechanism 69 includes hollow slide 77 located in channel 41 and supported for movement on pins 78 (one shown) extending through channel 41 and slots in slide 77. Slide 77 also has an end 79 extending through a suitable opening through spreader plate 42. End 79 is rigid with the slide and has rod 80 extending transversely therethrough and rigid therewith. Rod 80 extends between the ends of 64 of arm 60 and 68 of arm 65 and forward thereof. Therefore rearward movement of slide 77 will force arms 60 and 65 rearwardly causing the associated wheel assemblies to move toward the soil thereby lifting frame 11 and thus raising the disks to create a shallower furrow. Opposite movement will provide a deeper furrow. The movement of slide 77 is caused by a depth adjustment rod 81 having a right hand thread at its rearmost end that is engageable with a complementary internal thread in the rearward end of the slide 77. Indicator 82 is mounted on slide 77. Attached to the end of rod 81 is knob 84. Rotation of knob 84 clockwise will move indicator 82 and slide 77 rearward thus lowering the gauge wheels to create a shallow furrow. The indicator will move toward the zero gauge position shown in FIG. 2. Turning counterclockwise will produce a counter result. As shown, the indicator indicates an approximate 2 inch planting depth. Suitable detent means can be provided to maintain knob 84 in the set position.

Scrapers such as right hand scraper 86 (see FIG. 5) which extends from frame 11 is located outside of the 8:30 to 4:30 position of the contact of the gauge wheel with the disk noted, will remove soil that sticks to the disk as it leaves the furrow. Normally, this soil falls back alongside the furrow or inside the gauge wheel rim where it moves out as water over a dam. However, when the tool bar is raised, and since each arm 60 and 65 can drop away from rod 80, this allows the accumulated scraped soil to drop out from this area, aiding in cleaning the apparatus.

Referring to FIG. 1, the gauge wheels are shown in broken lines at the same elevation of the disks at the zero furrow position. FIG. 2 discloses the substantial meeting of the preferably staggered disks and the gauge wheels in the zero position. The solid line position of the gauge wheels in FIG. 1 discloses a two inch planting furrow, while the upper broken line position shows the approximate highest elevation of the gauge wheels which provides approximately a four inch furrow depth. Also to be noted from FIG. 1 is that gauging occurs (with little change) between the maximum depth of the disks (and laterally adjacent the disks) and where the disks exit the soil. The compaction runner provides a consistent V-shaped firmed furrow bottom while the deflector or shoe prevents soil inflow into the furrow and provides support for the seed tube.

FIG. 3 discloses the gauged furrow and the mounds 74a of moist uncompacted soil for later deposition into the furrow after the seed during the planting process.

It is felt that the operation of the apparatus is readily apparent from the description detailed above. The apparatus clearly provides an accurately gauged furrow wherein the gauging is accomplished laterally close to the disks and longitudinally close to the maximum depth achieved by the disks while primarily also maintaining desirable furrow characteristics.

What is claimed is:

1. A furrow forming apparatus for a seed planter comprising:
    (a) a frame, said frame being adapted to be attached for towing to a mobile power source;
    (b) a pair of opposed, furrow forming disks rotatably mounted on said frame, with the disks substantially contacting each other at the approximate point of entry into the soil and diverging apart rearwardly and upwardly relative to the direction of travel; and
    (c) a pair of gauge wheels mounted on said frame for regulating furrow depth, each wheel being located adjacent an outer surface of a disk and rotatably mounted on an axis rearward of the disk axis of rotation and including means inward the outer periphery of the wheel and located immediately adjacent the disk to trap therebetween soil from the furrow to form a mound of soil along the upper edge of the furrow above the imprint of the wheel in the soil.

2. The apparatus of claim 1 in which said means is a radially inwardly located recessed lip of said wheel.

3. The apparatus of claim 2 in which said lip has a peripheral configuration that is generally parallel to the outer wheel periphery and in which each said wheel includes a resilient tire having side walls and said lip is resilient and extends from a tire wall.

4. The apparatus of claim 3 in which each wheel is individually mounted and in which each wheel axis extends downwardly from the associated disk axis to relieve pressure on the mound of soil and in which the lip substantially contacts the disk prior to its entry into the soil to prevent trash flow between lip and disk.

5. The apparatus of claim 4 further comprising furrow defining means located rearward of said disks.

6. The apparatus of claim 5 further comprising means located rearward of the furrow defining means to prevent soil flow into the furrow.

7. The apparatus of claim 6 further comprising means for adjusting the height of the gauge wheels relative to the frame to vary furrow depth.

8. The apparatus of claim 7 in which the axes of the disks are staggered longitudinally so that the periphery of one disk substantially contacts the other disk inwardly of its periphery and the associated gauge wheels are similarly staggered.

9. The apparatus of claim 4 further comprising a scraper for the outer surface of each disk, each scraper being located above the axis of each disk and above where the lip leaves substantial contact with the disk to scrape away any soil that sticks to the disk.

* * * * *